May 31, 1960 V. W. BOLIE 2,938,670

MEANS FOR MEASURING CORRELATION

Filed Feb. 28, 1957

INVENTOR.
VICTOR W. BOLIE
BY Moody and Goldman
ATTORNEYS 2,938,670

MEANS FOR MEASURING CORRELATION

Victor W. Bolie, Cedar Rapids, Iowa, assignor to Collins Radio Company, Cedar Rapids, Iowa, a corporation of Iowa Filed Feb. 28, 1957, Ser. No. 642,992

10 Claims. (Cl. 235—181)

Figure 1:
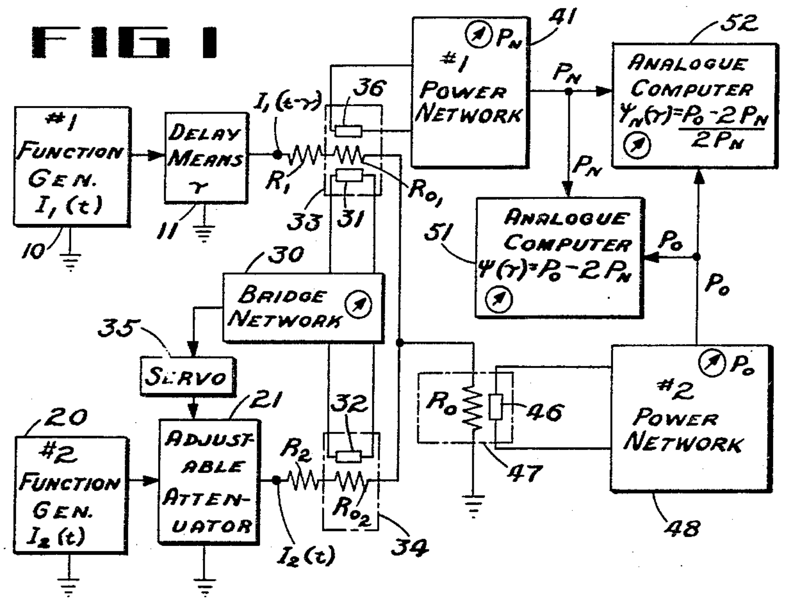

This invention relates to means for determining the correlation between any functions expressed as electrical functions of time.

The correlation function is a statistical tool in determining whether different mathematical variations are related and, if so, to what degree. For example, it may be required to determine whether two noise currents or voltages are derived from the same source. If they are not, they have zero cross-correlation. If they are so derived, they have a degree of auto-correlation. The satistically-derived theory of correlation is becoming increasingly important in the study of information theory and in the design of equipment using such theory.

The cross-correlation function determines the relationship between two independently-derived functions. For example, it may be used to recognize a given external function when it is represented among a given number of discrete functions stored in a memory device. The external function is compared with each of the stored functions, and their cross-correlation functions are respectively derived. The most similar stored function in the memory is recognized by providing the highest degree of cross-correlation. Where a signal has been modified, such as after it has passed through a filter network, its degree of modification can be determined with the assistance of its auto-correlation function with the unmodified signal.

In regard to any two functions $I_1(t)$ and $I_2(t)$, the general cross-correlation function $\psi(\tau)$ is defined as:

$$\psi(\tau)=\lim_{T\to\infty}\frac{1}{2T}\int_{-T}^{+T}I_1(t-\tau)I_2(t)dt \qquad (1)$$

When the functions in (1) become identical except for time displacement $\tau$, the general auto-correlation function $\phi(\tau)$ is obtained, which is defined mathematically as follows:

$$\phi(\tau)=\lim_{T\to\infty}\frac{1}{2T}\int_{-T}^{+T}I_1(t-\tau)I_1(t)dt \qquad (2)$$

In order to provide an over-all basis for comparison of correlation functions, each can be normalized against the product of the root-mean—square values of its two current functions. Thus, the normalized cross-correlation function $\psi_N(\tau)$ is:

$$\psi_N(\tau)=\frac{\lim_{T\to\infty}\frac{1}{2T}\int_{-T}^{T}I_1(t)I_2(t-\tau)dt}{\sqrt{\lim_{T\to\infty}\frac{1}{2T}\int_{-T}^{T}I_1^2(t)dt}\sqrt{\lim_{T\to\infty}\frac{1}{2T}\int_{-T}^{T}I_2^2(t-\tau)dt}}=\frac{\lim_{T\to\infty}\int_{-T}^{T}I_1(t)I_2(t-\tau)dt}{\sqrt{\lim_{T\to\infty}\int_{-T}^{T}I_1^2(t)dt\times\int_{-T}^{T}I_2^2(t-\tau)dt}} \qquad (3)$$

and the normalized auto-correlation function $\phi_N(\tau)$ reduces to:

$$\phi_N(\tau)=\frac{\lim_{T\to\infty}\int_{-T}^{T}I_1(t)I_1(t-\tau)dt}{\lim_{T\to\infty}\int_{-T}^{T}I_1^2(t)dt} \qquad (4)$$

A few devices have been devised in the past for determining correlation functions, and they provide different approaches to the problem. Such a device is described and claimed in patent application Ser. No. 542,077, now Patent No. 2,800,583, to Irvin H. Gerks, titled "Means for Determining Cross-Correlation Coefficients," which is assigned to the assignee of the present invention. Another approach is given in an article by Henry E. Singleton, titled "A Digital Electronic Correlator," in the "Proceedings of the I.R.E.," December 1950, pages 1422–1428.

The present invention provides a system for determining correlation functions utilizing a resistor network and means for measuring power dissipated over a period of time in certain resistors of the network. Such measurement represents the value of an integration of a function causing the power dissipation. The invention, therefore, is capable of operating with signals that are direct and/or alternating currents or voltages, and can handle extremely broad-band signals.

Figure 2:
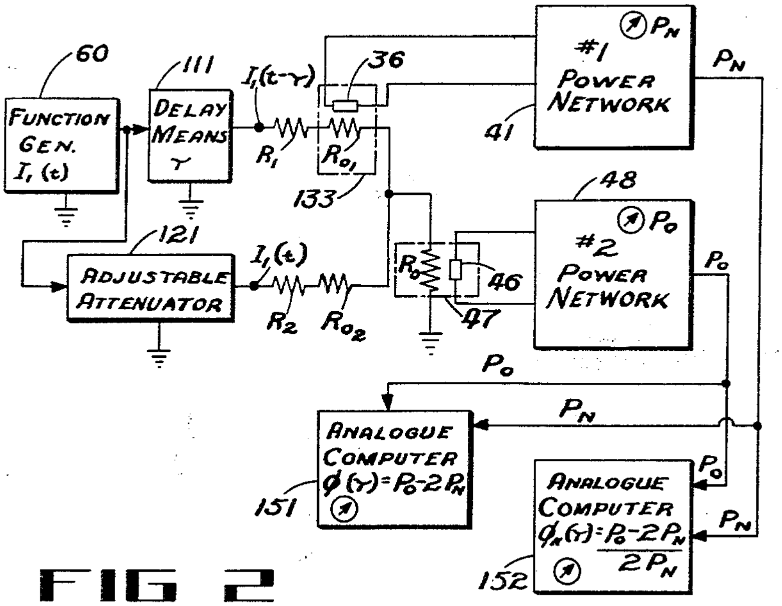

Further objects, features and advantages of this invention will become apparent to a person skilled in the art upon further study of the specification and drawings, in which:

Figure 1 illustrates one form of the invention used for determining cross-correlation functions; and, Figure 2 illustrates another form of the invention used for determining auto-correlation functions.

The basic system used in both Figures 1 and 2 includes an output resistor $R_o$. A first resistance network including resistors $R_1$ and $R_{01}$, and a second resistance network including resistors $R_2$ and $R_{02}$ are provided. Each resistance network is connected in series with output resistor $R_o$. Resistors $R_{01}$ and $R_{02}$ are equal in resistance to resistor $R_o$. Resistors $R_1$ and $R_2$ have equal resistances in the described embodiment, although this is not a general requirement of the invention, as will be explained below.

A first current function $I_1(t-\tau)$ is provided serially with resistor $R_1$, and a second current function $I_2(t)$ is provided serially with resistor $R_2$.

Thus, in Figure 1 a first function generator 10 provides current function $I_1(t)$. This current function may vary in any manner. Therefore, it may be random, such as a noise voltage, or non-random, such as any type of information signal. A variable-delay means 11 is connected in series between the output of first voltage function generator 10 and resistor $R_1$ to delay the first generator output by time $\tau$. Thus, the output provided by the delay means to the first resistor network is $I_1(t-\tau)$.

A second function generator 20 provides a signal $I_2(t)$. An adjustable attenuator 21 is connected in series between the output of second generator 20 and resistor $R_2$. Thus, current $I_2(t)$ can be adjusted to a lower value at the output of attenuator 21, which is required in some cases for determining the normalized functions.

When the normalized cross-correlation function is required attenuator 21 is adjusted so that the same average power is dissipated in resistor $R_{02}$ as is dissipated in resistor $R_{01}$. Mean power equalization is obtained by a bridge network 30 having a pair of thermistors 31 and 32 as different legs which are respectively located within respective insulating containers 33 and 34 near resistors $R_{01}$ and $R_{02}$ to sense their respective temperature variations. The heat containers 33 and 34 each accumulate the heat for a relatively long period of operation by its signal, and this heat accumulation is an effective integration of the signal. Thus, signal integration is manifested by the temperature within each container, since temperature is proportional to heat. Attenuator 21 is adjusted so that over a relatively long period of time compared to the lowest signal fluctuation rate, the bridge 30 obtains a null to indicate equal power dissipation in resistors $R_{01}$ and $R_{02}$. It can be seen that in many cases adjustable attenuator 21 may be eliminated by making resistor $R_1$ and/or $R_2$ variable. In such case, either $R_1$ and/or $R_2$ is adjusted until a bridge balance is obtained to indicate equal power dissipation by resistors $R_{01}$ and $R_{02}$. The design of such bridge networks is well-known in the art.

A servo 35 is connected between the null output of bridge network 30 and attenuator 21 to provide automatic adjustment of the equalization of power in resistors $R_{01}$ and $R_{02}$. Servo 35 is slow acting compared to the lowest signal fluctuation rate.

Another thermistor 36 is provided in container 33 adjacent to resistor $R_{01}$ and is connected to a first power network 41 which provides an output signal $P_N$ proportional to the power dissipated by resistors $R_{01}$. Network 41 may be a bridge network having thermistor 36 as one leg.

Another thermistor 46 is located adjacent to output resistor $R_o$ in an insulating container 47 to sense its temperature. Thermistor 46 is connected to a second power network 48 which provides an output signal $P_O$ proportional to the power dissipated in resistor $R_o$. Network 48 may be a bridge circuit having thermistor 46 as one leg. The output information of networks 41 and 48 can be used directly to compute either the general or normalized cross-correlation functions according to Formulas 5 and 6 below, or well-known computers can be used to do the operation.

Hence, analog computers 51 and 52 each receive the output signals $P_N$ and $P_O$, which are D.C. signals that vary at only a very slow rate compared to the lowest rate signal component. Analog computer 51 solves Equation 5 and computer 52 solves Equation 6.

$$\psi_N(\tau)=\frac{P_O-2P_N}{2P_N} \qquad (5)$$

$$\psi(\tau)=P_O-2P_N \qquad (6)$$

Generally, the normalized cross-correlation function $\psi_N(t)$ is the most desirable form of cross-correlation information. However, in some cases, the general cross-correlation function $\psi(t)$ is sufficient, and it can be obtained with the simpler computer 51.

Analog computers that solve equations of the type given herein are well-known. See "Analysis of Feedback Control Systems," by Bruns and Saunders, pages 121, 216–218. Also see pages 213–215 in the same book for thermistor sensing circuits, and bridge circuits and servos for them.

A proof of the operation of the system in Figure 1 is given as follows:

Power $P_O$ dissipated in output resistor $R_o$ is given by the expression:

$$\lim_{T\to\infty}\frac{1}{2T}\int_{-T}^{T}R_oI_o^2(t)\,dt \qquad (7)$$

where $I_o(t)$ is the total instantaneous current function across resistor $R_o$. By having a very long thermal-lag in the heat containers, a very long integration time, T, is obtained which very nearly approximates lim $T\to\infty$. From inspection of Figure 1, it can be seen that current $I_o(t)$ is equal to:

$$I_o(t)=[I_1(t+\tau)+I_2(t)] \qquad (8)$$

Squaring both sides obtains the following:

$$I_o^2(t)=[I_1^2(t+\tau)+I_2^2(t)+2I_1(t+\tau)I_2(\tau)] \qquad (9)$$

Then substituting Expression 9 in Expression 7 obtains the following:

$$P_O=\lim_{T\to\infty}\frac{R_o}{2T}\left[\int_{-T}^{T}I_1^2(t-\tau)\,dt+\int_{-T}^{T}I_2^2(t)\,dt+2\int_{-T}^{T}I_1(t-\tau)I_2(t)\,dt\right] \qquad (10)$$

In Expression 10 the term $$\lim_{T\to\infty}\frac{R_o}{2T}\int_{-T}^{T}I_1^2(t-\tau)\,dt$$

represents the power $P_1$ which is dissipated in resistor $R_{01}$ by first current $I_1(t-\tau)$, since this resistor is equal to resistor $R_o$. Further, in Expression 10, the term $$\lim_{T\to\infty}\frac{R_o}{2T}\int_{-T}^{T}I_2^2(t)\,dt$$

is the power $P_2$ dissipated in resistor $R_{02}$, which is also equal to resistor $R_o$. When compared with Expression 1 above, the last term in Expression 10 will be recognized as the cross-correlation function multiplied only by constant factors. Since powers $P_1$ and $P_2$ are equalized by bridge network 30, they each may be represented by $P_N$. Accordingly, Expression 10 can be rewritten as:

$$P_O=2P_N+2R_o\psi(\tau) \qquad (11)$$

Therefore $$\psi(\tau)=H(P_O-2P_N) \qquad (12)$$

where H is a constant equal to $$\frac{1}{2R_o}$$

Therefore, it is proven that the system in Figure 1 having an analog computer solving the expression of $P_O-2P_N$ can with proper calibration indicate directly the cross-correlation function $\psi(\tau)$ between two independent functions $I_1(t-\tau)$ and $I_2(t)$.

For a proof of the normalized cross-correlation function of Expression 5 above, defining Expression 3 has its numerator and denominator multiplied by $R_o$, and Expression 1 is substituted in the numerator, which can then be written as follows:

$$\psi_N(\tau)=\frac{R_o\psi(\tau)}{\sqrt{\lim_{T\to\infty}\frac{R_o}{2T}\int_{-T}^{T}I_1^2(t)\,dt}\sqrt{\lim_{T\to\infty}\frac{R_o}{2T}\int_{-T}^{T}I_2^2(t-\tau)\,dt}} \qquad (13)$$

Note that the quantity under the left radical sign is $P_1$ and the quantity under the right radical sign is $P_2$. Accordingly, Expression 13 can be rewritten as follows:

$$\psi_N(\tau)=\frac{R_o\psi(\tau)}{P_N} \qquad (14)$$

Thus, if Expression 12 above is substituted in Expression 14, the normalized cross-correlation function appears in terms of $P_O$ and $P_N$ as follows:

$$\psi_N(\tau)=(G)\frac{P_O-2P_N}{2P_N} \qquad (15)$$

where G is a calibration constant. This expression is solved by analog computer 52.

In Figure 2, a system is shown for measuring the auto-correlation between a function $I_1(t)$ and that function delayed to provide another function $I_1(t-\tau)$. These two functions are provided from a single function generator 60. A delay means 111 is connected to the output of generator 60 and provides a delay $\tau$ to obtain $I_1(t-\tau)$. An adjustable attenuator 121 is also connected to the output of generator 60 to provide $I_1(t)$ at a proper level, which is obtained by adjusting the attenuator so that its resistance is equal to the resistance of delay means 111. Then, the two functions $I_1(t-\tau)$ and $I_1(t)$ will have equal power when applied to their respective resistors $R_{01}$ and $R_{02}$. A bridge network, such as item 30 in Figure 1, is not then needed in the circuit of Figure 2, since each signal initially has the same power level at generator 60.

Otherwise, the circuitry following delay means 111 and attenuator 121 in Figure 2 is identical to that in Figure 1 following delay means 11 and attenuator 21, and need not be repetitiously redescribed.

An analog computer 151, like computer 51, solves the quantity:

$$\phi(t)=P_O-2P_N \quad (16)$$

And another analog computer 152, like computer 52, computes the quantity:

$$\phi_N(t)=\frac{P_O-2P_N}{2P_N} \quad (17)$$

The proof of the operation of the auto-correlation circuit in Figure 2 is obtained in the same manner as was used in the development of the proof for the cross-correlation circuit of Figure 1. Thus, the current across output resistor $R_0$ in Figure 2 is $$I_o(t)=I_1(t+\tau)+I_1(t) \quad (18)$$

By squaring Expression 18 and inserting it into Expression 17 the following is obtained:

$$P_o=\lim_{T\to\infty}\frac{R_o}{2T}\left[\int_{-T}^{T}I_1^2(t-\tau)dt+\int_{-T}^{T}I_1^2(t)dt+2\int_{-T}^{T}I_1(T-\tau)I_2(t)dt\right] \quad (19)$$

It is, accordingly, noted that the term $$\lim_{T\to\infty}\frac{R_o}{2T}\int_{-T}^{T}I_1^2(t-\tau)dt$$

equals the power $P_1$ dissipated by resistor $R_{01}$ in Figure 2. Further, it is noted that the term $$\lim_{T\to\infty}\frac{R_o}{2T}\int_{-T}^{T}I_1^2(t)dt$$

is the power $P_2$ dissipated in resistor $R_{02}$ in Figure 2. However, over a long period of integration time T, the power dissipated in the resistors $R_{01}$ and $R_{02}$ is very nearly equal due to the prior adjustment of attenuator 121 as explained above. The last term on the right in Expression 19 is noted from Expression 2 to be the auto-correlation function multiplied by a constant. Therefore, Expression 19 can be rewritten as follows:

$$P_O=2P_N+2R_o\phi(\tau) \quad (20)$$

Therefore, solving for the general auto-correlation function $\phi(\tau)$ gives:

$$\phi(\tau)=H(P_O-2P_N) \quad (21)$$

Thus, it is proven that the same type of computer can solve both Equations 21 and 12. Similarly, the normalized auto-correlation function can be obtained by multiplying the numerator and denominator of Expression 4 by $R_o$ and substituting 2 to provide:

$$\phi_N(\tau)=\frac{R_o\phi(\tau)}{P_N} \quad (22)$$

By substituting Expression 21 into 22 the following expression is obtained for the normalized function:

$$\phi_N(\tau)=(G)\frac{P_O-2P_N}{2P_N} \quad (23)$$

Consequently, analog computer 152, solving the function $$\frac{P_O-2P_N}{2P_N}$$

provides the normalized auto-correlation function after being properly calibrated, in the same manner that computer 52 solves for the normalized cross-correlation function.

In some cases, the exact normalized correlation function may not be required. Then, it may only be necessary to provide an indication of the general variation of the normalized correlation function with different values of $\tau$ or with different functions. In such case, only power network 48 is required and the circuitry such as thermistors 32 and 36, first sensing network 41, and analog computers 51, 151, 52 and 152 can be eliminated. This can be shown by inspecting Expressions 11 and 20 above, wherein it is obvious that auto-correlation functions vary with output power $P_O$.

Generators 10, 20 and 60 can be voltage generators instead of current generators. In such case, resistors $R_1$ and $R_2$ are each made large compared to resistor $R_o$. Then, the large values of $R_1$ and $R_2$ convert the voltage functions into proportional current functions in resistors $R_{01}$, $R_{02}$ and $R_o$. Therefore, the analysis given above holds for either case, although different calibrations may be required.

Although this invention has been described with respect to particular embodiments thereof, it is not to be so limited as changes and modifications may be made therein which are within the full intended scope of the invention as defined by the appended claims.

I claim:

1. Means for determining correlation between a pair of electrical-time functions, comprising a pair of input terminals, a first resistance network connected at one end to one of said input terminals, a second resistance network connected at one end to the other of said input terminals, an output resistance means $R_o$, said first resistance network being connected serially to said output resistance means $R_o$, said second resistance network being connected in series with said output resistance means $R_o$, said first and second resistance networks being in parallel with each other, means for equalizing the average currents in said output resistance means $R_o$, a heat-containing means being provided about said resistance means $R_o$, a temperature-sensing element provided within said heat-containing means, power network means connected to said temperature-sensing element and providing an output $P_o$ varying with the temperature within said heat-containing means, whereby the output of said network means varies to an approximate amount with the degree of correlation.

2. A system as defined in claim 1, wherein a resistance means $R_{01}$ is included within said first resistance network, resistance means $R_{01}$ and $R_o$ being equal, a second heat-containing means provided with $R_{01}$, a second temperature-sensing element within said second heat-containing means, and second power network means connected to said second temperature-sensing means to provide a power output $P_N$ varying with the temperature within said second heat-containing means, and analogue computing means for computing the quantity $$P_O-2P_N$$

which is proportional to the correlation function for the pair of electrical-time functions.

3. A system as defined in claim 1, wherein a resistance means $R_{01}$ is included within said first resistance network, resistance means $R_{01}$ and $R_o$ being equal, a second heat-containing means provided about $R_{01}$, a second temperature-sensing element within said second heat-containing means, and second power network means connected to said second temperature-sensing means to provide a power output $P_N$ varying with the temperature within said second heat-containing means, and analogue computing means for computing the quantity $$\frac{P_O-2P_N}{2P_N}$$

which is proportional to the normalized-correlation function for the pair of electrical-time functions.

4. Means for determining the cross-correlation between a pair of electrical functions of time $I_1(t)$ and $I_2(t)$, comprising a first terminal for receiving said first function $I_1(t)$, and a second input terminal for receiving said second function $I_2(t)$, equal mean power over a period of time being provided for said pair of signals, means for making equal the average powers of the functions over the period of time, a first resistance network, including a resistance means $R_{o1}$, a second resistance network, including a resistance means $R_{o2}$, with resistance means $R_{o1}$ and $R_{o2}$ being equal, an output resistance means $R_o$ being connected in series with said first resistance network and connected in series with said second resistance network, but said first and second resistance networks being in parallel with each other, a pair of heat containers being respectively provided about $R_o$ and $R_{o1}$, first temperature-sensing means provided within said container having resistance means $R_{o1}$, a first power network connected to said first temperature-sensing means to provide an output, the power $P_N$ controlled by the first temperature-sensing means, a second temperature-sensing element provided within said container having output resistance means $R_o$, a second power network connected to said second temperature-sensing element to provide an output power $P_O$ controlled by said second temperature-sensing means, whereby the cross-correlation function is proportional to $(P_O-2P_N)$.

5. Means for determining the cross-correlation between two electrical functions $I_1(t)$ and $I_2(t)$, comprising delay means receiving at its input said first function $I_1(t)$, a first resistance network including a resistance means $R_{o1}$ connected serially with the output of said delay means, an insulating container provided about said resistance means $R_{o1}$, first temperature-sensing means included in said first container, output resistance means $R_o$ connected serially with said first resistance network, an adjustable attenuator receiving said second function $I_2(t)$ at its input, a second resistance network including a second resistance means $R_{o2}$ equal to said first resistance means $R_{o1}$, said second resistance network being connected in series between the output of said adjustable attenuator and said output resistance means $R_o$, said first and second resistance networks being in parallel with respect to said output resistance means $R_o$, a second container included about said resistance means $R_{o2}$, second temperature-sensing means included within said second container, a bridge network including said first and second temperature-sensing means, and providing a null output when equal power is dissipated by resistance means $R_{o1}$ and $R_{o2}$, servo means coupled between the output of said resistance network and said adjustable attenuator to maintain equality of power dissipation for resistors $R_{o1}$ and $R_{o2}$, another temperature-sensing means included within said first container, a power network connected to said another temperature sensing means to provide an output $P_N$ proportional to the power dissipated by resistance means $R_{o1}$, a third container provided about output resistance means $R_o$, an output temperature-sensing means included within said third container, an output power network connected to said output temperature-sensing means to provide an output $P_O$ proportional to the power dissipated by resistor $R_o$, wherein the cross-correlation function varies in an approximate manner with $P_o$.

6. A system for determining cross-correlation as defined in claim 5 including analogue computer means solving the expression:

$$\psi(\tau)=P_O-2P_N$$

where $\psi(\tau)$ is the cross-correlation function, and means for indicating its value.

7. A system for determining cross-correlation as defined in claim 5, including analogue computer means solving the equation:

$$\psi_N(\tau)=\frac{P_O-2P_N}{2P_N}$$

where $\psi_N(\tau)$ is the normalized cross-correlation function, and calibrated means for indicating its value.

8. Means for determining auto-correlation, comprising a function generator providing an electrical output $I(t)$, delay means having its input connected to the output of said function generator, an attenuator having its input connected to the output of said function generator, said attenuator providing an output having an average current equal to the average current provided by the output of said delay means, a pair of terminals respectively connected to the outputs of said delay means and said adjustable attenuator, a first resistance network including a resistance means $R_{o1}$ connected to one of said terminals, a second resistance network including a resistance means $R_{o2}$ connected to said other terminal, an output resistance means $R_o$ being connected in series with each of said resistance networks, a first insulating container provided about said resistance means $R_{o1}$, a first temperature-sensing means included within said first container to sense the temperature rise of said resistance means $R_{o1}$ due to current flow through it, first power network means connected to said first temperature-sensing means to provide an output $P_N$ proportional to the power $P_N$ dissipated in said resistance means $R_{o1}$, a second insulating container provided about said output resistance means $R_o$, a second temperature-sensing means included within said second container, a second power network means connected to said second temperature-sensing means to provide an output $P_O$ proportional to the power dissipated by said resistance means $R_o$.

9. Means for determining auto-correlation as defined in claim 8, including analogue computing means for solving the expression:

$$P_O-2P_N$$

which varies proportionally to the auto-correlation function, and calibrated means for indicating the computed function.

10. Means for determining auto-correlation as defined in claim 8, including analogue computer means for solving the expression:

$$\frac{P_O-2P_N}{2P_N}$$

which varies proportionally to the normalized auto-correlation function, and calibrated means for indicating the computed function.

References Cited in the file of this patent

UNITED STATES PATENTS

| | | |
|---|---|---|
| 2,059,594 | Massa | Nov. 3, 1936 |
| 2,471,262 | Cousins | May 24, 1949 |

OTHER REFERENCES

"Electronic Instruments" (Greenwood et al.), published by McGraw-Hill Book, New York, 1948, page 33.

"Subminiature Thermal Computer Element (Davidson et al.), Electronic Equipment, vol. 3, No. 6, June 1955, pages 16–19.